United States Patent [19]

Shaffer

[11] 4,226,664
[45] Oct. 7, 1980

[54] LAMINATING APPARATUS

[75] Inventor: Myron W. Shaffer, Irving, Tex.

[73] Assignee: Laminating Equipment, Inc., Pantego, Tex.

[21] Appl. No.: 903,758

[22] Filed: May 8, 1978

Related U.S. Application Data

[62] Division of Ser. No. 771,179, Feb. 23, 1977, Pat. No. 4,090,911.

[51] Int. Cl.² .......................... B32B 31/00; B31F 5/00
[52] U.S. Cl. ...................................... 156/499; 156/555
[58] Field of Search ..................... 156/499, 555, 583

[56] References Cited

U.S. PATENT DOCUMENTS

| 2,224,370 | 12/1940 | Wescott | 156/499 |
| 3,309,983 | 3/1967 | Dresser | 156/555 |
| 3,322,593 | 5/1967 | Conti | 156/578 |
| 3,823,047 | 7/1974 | Colombo | 156/555 |

Primary Examiner—Douglas J. Drummond
Attorney, Agent, or Firm—James E. Bradley

[57] ABSTRACT

An apparatus for laminating articles with plastic of the type having supply rolls, pressure rollers and pull rollers through which a web of plastic is drawn. Heat shoes heat the plastic prior to the pressure rollers to cause an adhesive side to become fluent. The heat shoes have a large heating surface and are filled with sand. A plenum chamber directs cooling air onto the bonded web between the pressure rollers and pull rollers. The upper rollers are carried by a spring biased slide while the lower rollers are journaled to the frame. An eccentric mechanism mounted in the slide lifts the slide and upper rollers for threading and cleaning. A threaded linking member is attached between the slide and the top of the frame for incrementally lifting the upper pressure roller to allow single side lamination.

1 Claim, 6 Drawing Figures

LAMINATING APPARATUS

CROSS REFERENCE TO RELATED APPLICATION

This is a division of application Ser. No. 771,179, filed Feb. 23, 1977 now U.S. Pat. No. 4,090,911.

BACKGROUND OF THE INVENTION

1. Field of the Invention

This invention relates in general to laminating machines and in particular to an improved machine for continuously laminating articles with plastic.

2. Description of the Prior Art

Machines used for laminating articles, such as menus, cards and the like, use a type of plastic that has a thermoplastic side, such as polyethylene, that melts at a lower temperature than the other side, which may be a polyester based material such as Mylar. The plastic is normally in thicknesses from 0.0015 inch to 0.018 inch. Normally the plastic is drawn in webs from supply rolls past heating means into pressure and pull rollers. The heating means causes the adhesive sides to become slightly fluent, and the pressure rollers bond the heated webs to the article, which is sandwiched between. The pull rollers maintain tension on the web and stretch it while fans mounted below hasten cooling. A laminating apparatus of this type is shown in U.S. Pat. No. 3,309,983.

In order to increase the linear speed of the web for faster laminating, the web must be heated more quickly and cooled more quickly. If cooling is insufficient to cause the plastic to set prior to contacting the pull rollers, then wrinkling occurs. Also in conventional laminating devices, cleaning rollers and threading new rolls of plastic are tedius operations since the pressure and pull rollers are spring biased together and have no means to hold them apart. In addition it is not possible to laminate a single side of an article since during the period before and after the insertion of the article, the hot adhesive on the web would adhere to the adjacent roller.

SUMMARY OF THE INVENTION

It is a general object of this invention to provide an improved laminating apparatus.

It is a further object of this invention to provide an improved heating means for a laminating apparatus.

It is a further object of this invention to provide an improved cooling means for a laminating apparatus.

It is a further object of this invention to provide an improved mounting system for mounting the rollers in a laminating apparatus that spring-biases the rollers together and allows the upper rollers to be separated for cleaning and threading.

It is a further object to provide an improved means for mounting the rollers in a laminating apparatus that allows a single web to be used to laminate only one side of the article.

In accordance with these objects, a laminating apparatus is provided that has heat shoes that are filled with sand for effective heat transfer from the heater element to the walls. The heating surface has a large area over which the web is drawn including an arcuate forward portion and tangential flat joining surfaces. A plenum is located below the web because the pressure and pull rollers to direct a uniform and restricted stream of air onto the web for cooling. A slide is attached to the frame adjacent each pair of rollers, with the upper roller journaled into the slide and the lower roller journaled into the frame. A spring connected between the frame and slide biases the slide downward. A disk with a rod eccentrically attached is mounted rotatably in the slide, with the rod extending through a slot in the frame. Rotation of the disc lifts the entire slide and upper pressure roller to facilitate cleaning and threading. A threaded rod is attached to the slide and the top of the frame to incrementally lift the slide and top pressure roller. The clearance between the rollers is adjusted so as to be large enough for a web to pass through without its adhesive side touching the adjacent roller, yet small enough to apply pressure if an article is inserted between the rollers.

DESCRIPTION OF THE PREFERRED EMBODIMENT

Figure 1:
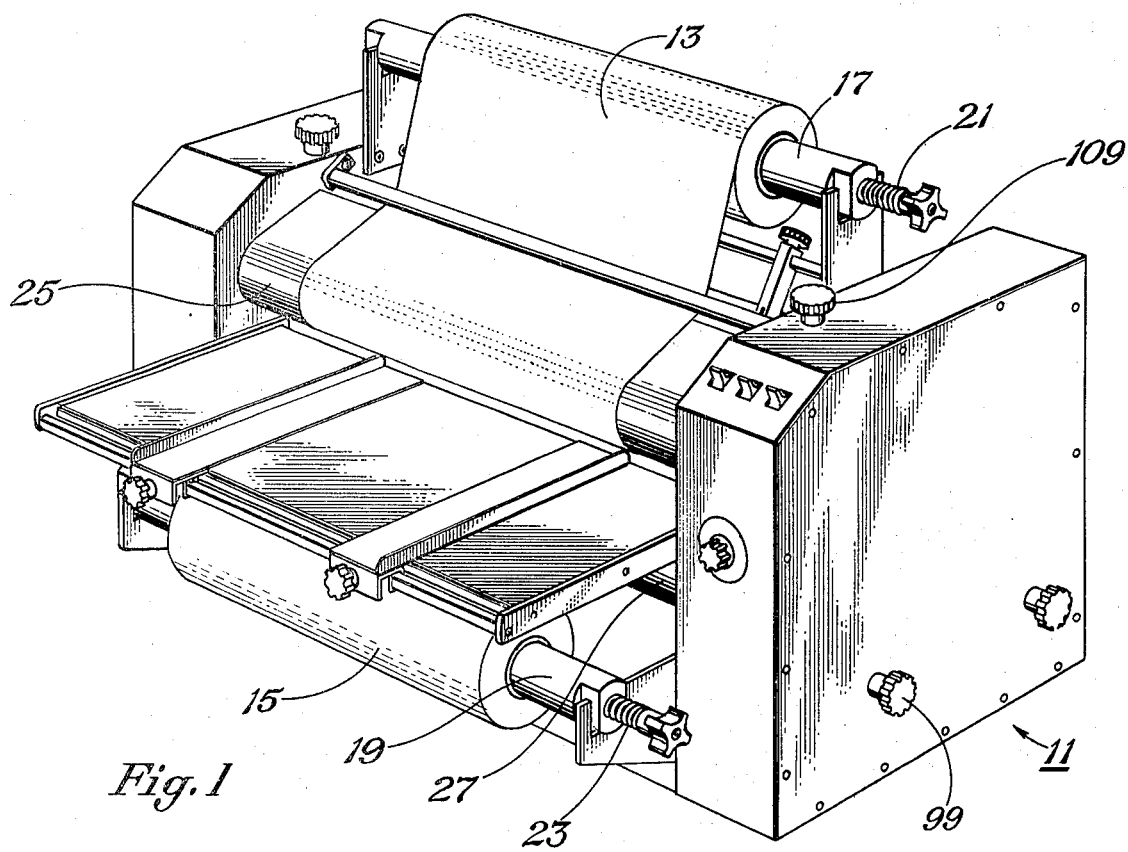
FIG. 1 is a perspective view of a laminating apparatus constructed in accordance with the teachings of this invention.
Figure 2:
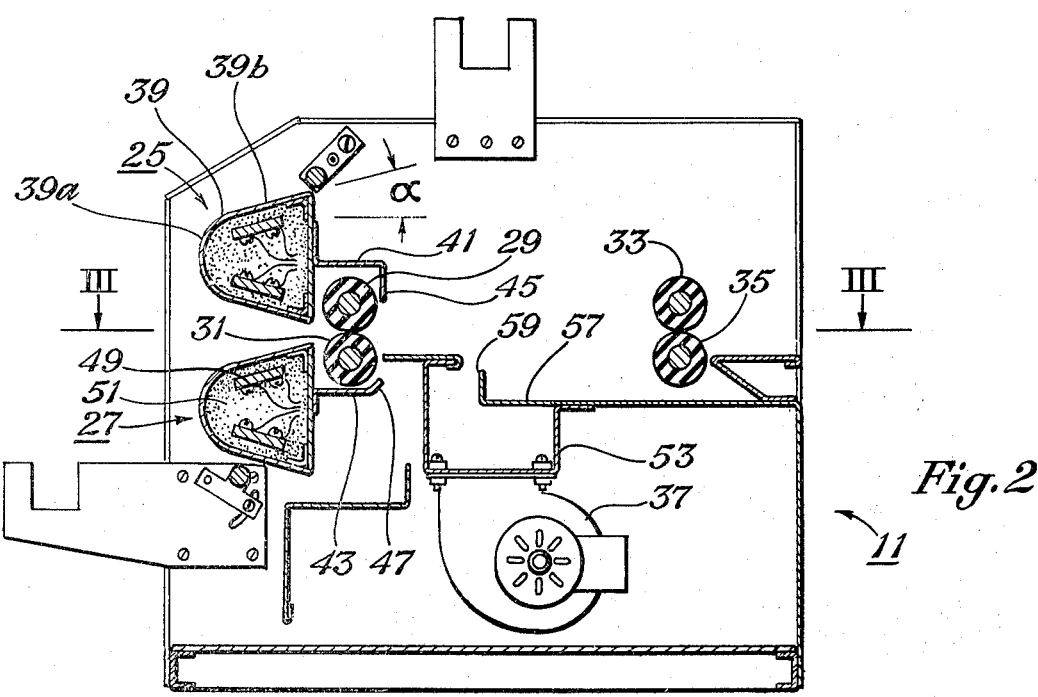
FIG. 2 is a vertical cross-sectional view of the laminating apparatus of FIG. 1.

Referring to FIG. 1 a laminating apparatus is shown with upper and lower supply rolls 13, 15 of plastic. Supply rolls 13, 15 are carried by cylindrical holders 17, 19 that have tension elements or brakes 21, 23 to provide a drag as a web of the plastic is drawn, maintaining tension in the web. Referring to FIG. 2, a pair of heating means or heat shoes 25, 27 are mounted, each between a supply roll 13, 15 and a pressure roller 29, 31. A pair of pull rollers 33, 35 are mounted behind the pressure rollers 29, 31 at a selected distance for maintaining tension as the web of plastic cools. Means for cooling the web including a squirrel-cage blower 37 are mounted below the web between the pressure and pull rollers.

The heat shoes 25, 27 are elongated, hollow, metal enclosures of length greater than the width of the plastic. The heating surface 39 of each shoe is on the forward side of the apparatus 11 for contacting the web as it is drawn across. The heating surfaces are smooth and preferably coated with Teflon. The heating surfaces 39 contain an arcuate portion 39a on the extreme forward portion. This arcuate portion is joined by a flat or planar portion 39b extending tangentially rearward at an angle α in the range from 10° to 20°, preferably 17°, with respect to the center line of the arcuate surface. The upper and lower portions of the heating surface 39 are symmetrical.

Brackets or baffles 41, 43 are attached to the rear surface of the heat shoes 25, 27 and extend rearward past the pressure rollers 29, 31. Both brackets 41, 43 have an end surface 45, 47 that bends toward the pressure rollers 29, 31 to retain heat in the vicinity of the pressure rollers. Baffle 41 is spaced a selected distance above upper pressure roller 29 since this roller moves vertically to accomodate various thicknesses of articles.

A pair of electrical resistance heater elements 49 are mounted in the heat shoes 25, 27 adjacent the upper and lower portions of heating surface 39. The remaining space in the interior is filled with sand, as indicated at 51. The desired operating temperature is preferably in the range from 280° F. to 310° F.

Figure 3:
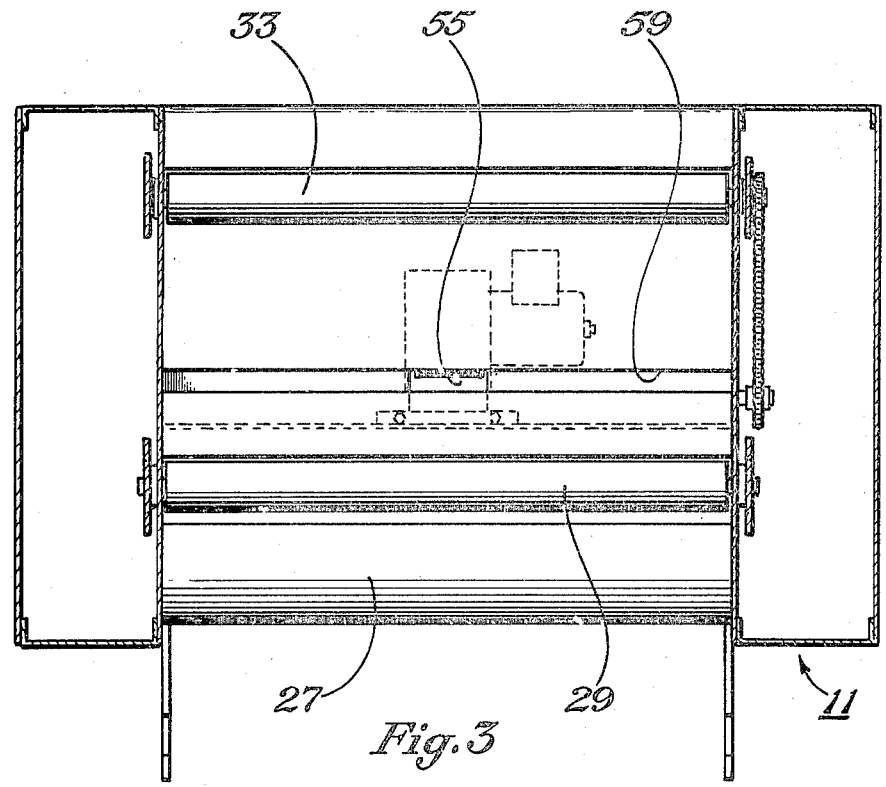
FIG. 3 is a cross-sectional view of the laminating apparatus of FIG. 2 taken along the lines III—III.

Fan or blower 37 is mounted to the bottom of a plenum 53 that extends the width of the pressure rollers and heat shoes, as shown in FIG. 3. The plenum 53 is a rectangular enclosure with an aperture 55 in its bottom adjacent blower 37 for the air to pass through. The sidewalls of the plenum 53 are perpendicular with the bottom wall, and the top 57 is partially enclosed. A restricted opening or slot 59 is located on the top 57 and extends the full length of the plenum 53. This slot is approximately ¼ of the width of the plenum 53 and directs a uniform flow of air to the plastic web for cooling.

Figure 4:
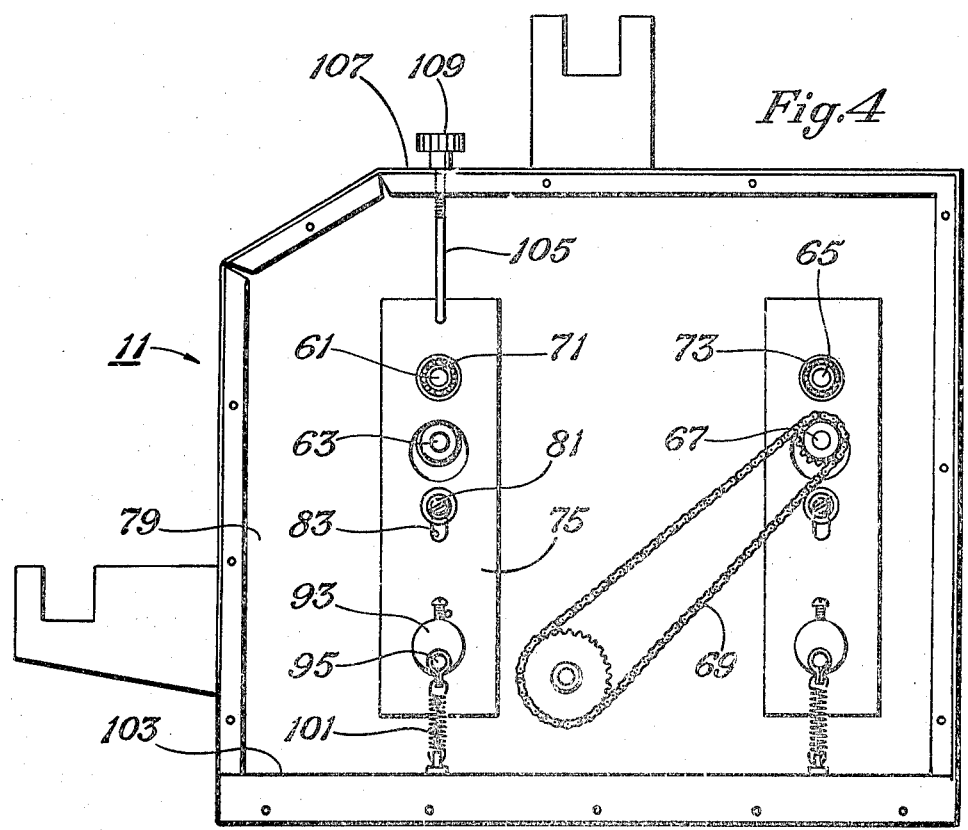
FIG. 4 is a side elevational view of the laminating apparatus of FIG. 1 with the cover removed.
Figure 5:
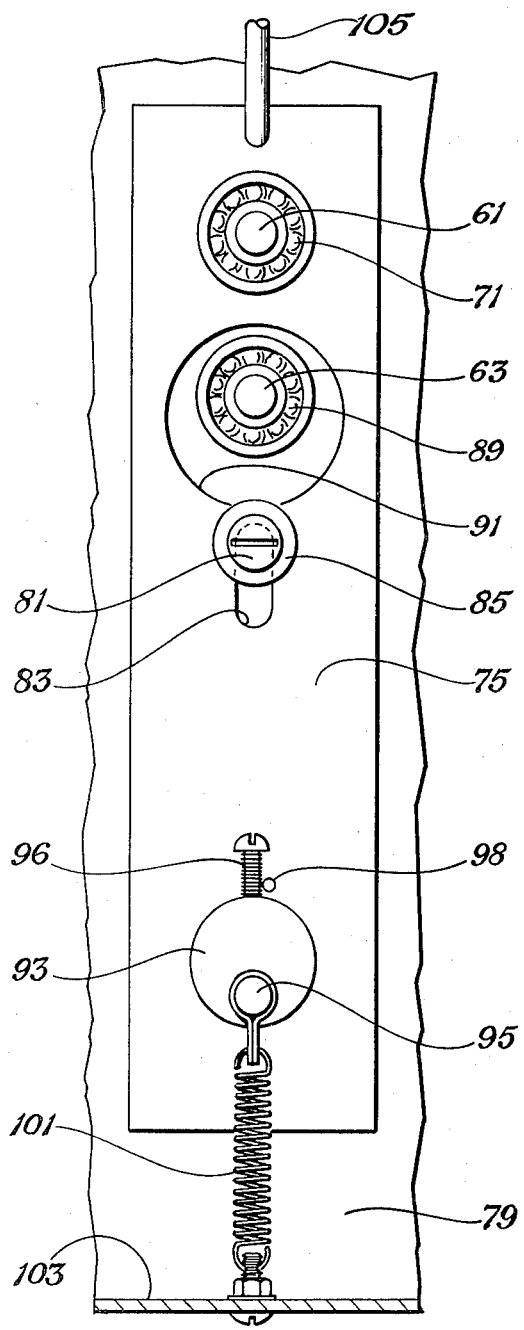
FIG. 5 is an enlarged partial side elevational view of the laminating apparatus as shown in FIG. 4.
Figure 6:
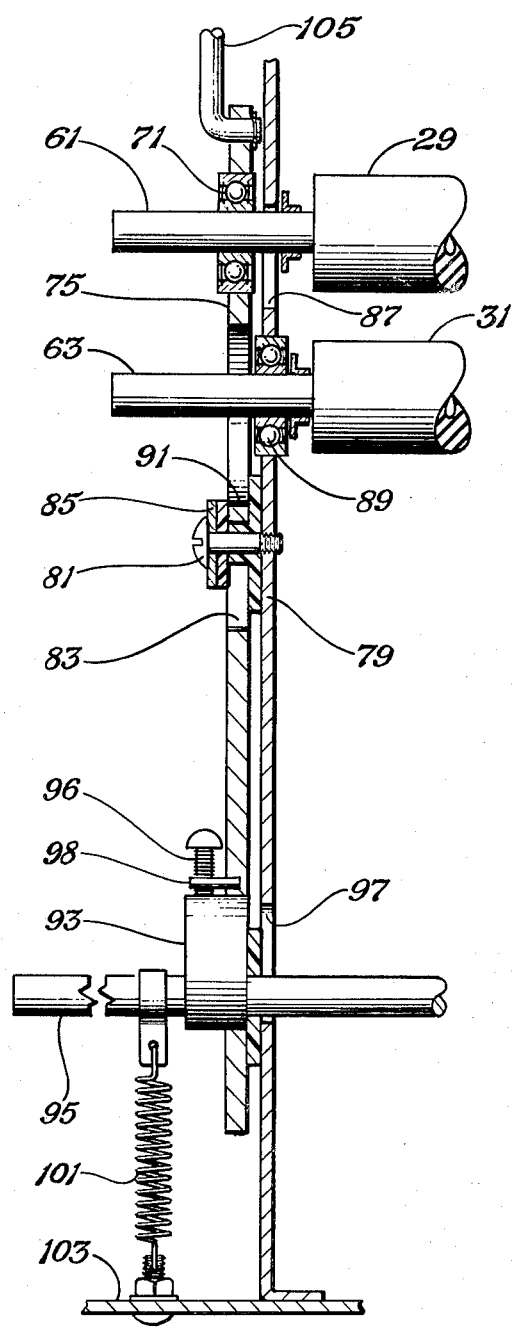
FIG. 6 is a vertical cross-sectional view of the laminating apparatus as shown in FIG. 5.

The pressure rollers 29, 31 and pull rollers 33, 35 are mounted on axles 61, 63, 65, and 67 that are parallel with each other and with the length of the heat shoes 25, 27 and supply rolls 13, 15. The pressure and pull rollers are also in vertical alignment with their adjacent pair. The pressure and pull rollers are covered with a resilient material such as hypalon. Referring to FIG. 4, the lower pull roller axle 67 is driven by a chain drive 69 and electrical motor (not shown) that serves with the pull rollers as means for drawing the web past the heating means and through the pressure rollers. The axle 61, 65 of the upper pressure roller 29 and pull roller 31 are journaled in bearings 71, 73 that are mounted in a slide 75. Slide 75 is carried slidingly on each side of the frames 79 of the laminating apparatus 14 adjacent the ends of the pressure rollers 29, 31. An identical slide 75 is located on each side of the frame 79 adjacent the pull rollers 33, 35. As shown in FIGS. 5 and 6, each slide 75 is carried by the frame 79 by a screw 81 extending through an elongated slot 83 in the slide 75 and threaded into frame 79. A Teflon washer 85 allows the slide 75 to slide upward and downward a selected amount. The upper pressure roller axle 61 extends through an aperture or elongated slot 87 in frame 79 that is vertically enlarged in height greater than the diameter of axle 61 to allow vertical movement. The upper pull roller axle 63 also extends through a slot (not shown) in frame 79. The lower pressure roller axle 63 is journaled in a bearing 89 in frame 79 and extends through a slot or opening 91 in the slide. Lower pull roller axle 67 is journaled in a bearing (not shown) also and extends through an opening 91 for attachment of a sprocket for the chain drive 69. Consequently the upper pressure and pull rollers are mounted to the slide 75 for movement therewith, and the lower pressure and pull rollers are mounted stationarily to the frame 79.

A circular disk 93 is carried in each slide 79 near the bottom and is rotatable with respect to slide 75. A rod 95 extends through the disk 93 off-center and is rigidly attached to it so that rotating the rod rotates the disk 93. Rod 95 extends through an aperture or elongated slot 97 in frame 79 and is rigidly connected to the adjacent disk on the opposite side of the laminating apparatus. Slot 97 is vertically enlarged greater than the diameter of rod 95 to allow vertical movement with the slide 75. Rod 95 is attached to disk 93 off-center to provide eccentric movement. A screw 96 extends from the perimeter of disk 93. A stop member 98 extends outward from frame 79 adjacent screw 96 at a point selected to provide a stop for the screw when the screw is slightly off-center.

Knobs 99 (FIG. 1) are located on one side of the machine for rotation of the rods. A coil spring 101 is attached in tension between rod 95 and the base 103 of the frame 79. Spring 101 serves as means for biasing the slide 75 and upper pressure roller 29 and pull roller 33 downward. Spring tension is preferably in the range from 4 to 14 pounds. Rotation of the rod 95 causes the slide to move upward a selected distance as shown in FIG. 6, the screw 96 and stop 98 holding the slide in the upper position.

Referring to FIG. 4, an elongated linking member or threaded bolt 105 serves as means for incrementally raising and lowering slide 75 for single side laminations. The lower end of threaded bolt 105 is hooked into the top of slide 75, and the upper threaded end extends through a hole in the top 107 of the frame 79. A threaded receptacle or cap 109 is threaded to the upper end. Rotation of the threaded cap 109 gradually draws the slide upward or downward as the cap is rotated. A bolt 105 is located on each side of the pressure rollers 29, 31 but is not necessary at the pull rollers 33, 35 since sufficient cooling has taken place to set the adhesive prior to contacting the pull rollers.

In operation for double-side laminations, the upper and lower supply rolls 13, 15 are mounted on holders 17, 19. Knobs 99 are rotated to cause slide 75 to move upward, providing a clearance between the upper and lower pressure and pull rollers. The rollers may be cleaned, and the plastic drawn in webs over the upper and lower heat shoes 25, 27, then between the upper and lower pressure and pull rollers. The electrical resistance heater elements 49 are energized to heat the sand 51, heating surface 39, and baffles 41, 43. After the proper temperature is reached, the electrical drive is energized to rotate pull rollers 33, 35 drawing the two webs. Drag is supplied through brakes 21, 23 on the supply roll holders 17, 19, to create tension in the web. As the webs pass the heating surfaces 39, the adhesive side melts slightly, becoming fluent. The article to be laminated is inserted at the pressure rollers and pressure is applied on the webs to the article. Cooling air is drawn from the exterior and blown onto the lower side of the bonded web from blower 37 and plenum 53. Pull rollers 33, 35 maintain tension as the cooling takes place. The upper pressure and pull rollers 29 and 33 float upward and downward with the slide 75 as various thicknesses of articles are laminated.

If a single side of an article is to be laminated, then one web is removed. To prevent the adhesive side of the remaining web from adhering to the adjacent roller, a small clearance between the rollers is provided by rotating knob 109 to draw threaded bolt 105 to slide 75 upward. The clearance should be sufficiently large so that the adhesive side will not contact the adjacent pressure roller and sufficiently small so that pressure will be applied when an article passes through.

It should be apparent that an invention having significant advantages has been provided. A high speed laminator is provided with efficient heating and cooling means. The arcuate and planar heating surfaces provide a large linear area for heating without increasing the height of the machine. The sand filled interior increases the heat conductivity and provides a uniform temperature on the heating surface. The rear baffles retain the heat in the vicinity of the pressure rollers to heat them and also to prevent heat from entering the cooling zone. The plenum blows a uniform band of air onto the web for efficient cooling. Access for threading and cleaning is provided by the slide and eccentric mechanism. Laminations may be made only on one side by providing an incremental clearance between the pressure rollers.

While the invention has been shown in only one of its forms, it should be apparent to those skilled in the art that it is not so limited but is susceptible to various changes and modifications without departing from the spirit thereof.

I claim:

1. In an apparatus for continuously laminating articles with a plastic having an adhesive side that melts at a lower temperature than the other side, the apparatus being of the type having a pair of supply rolls of plastic, means for drawing webs from the supply rolls past heating means and through a pair of pressure rollers for bonding the webs together with the article sandwiched between, and a pair of pull rollers mounted behind the pressure rollers for maintaining tension as the bonded webs cool, an improved heating means comprising: upper and lower heat shoes mounted to the apparatus adjacent the pressure rollers and spaced apart vertically for contacting the webs, each heat shoe having a heating surface for contacting one of the webs and containing an electrical heater element means for heating the entire heating surface to a substantially uniform temperature above the melting temperature of the adhesive side, the heating surface having an arcuate portion joined by upper and lower planar surfaces symetrical with each other and extending rearward tangental to the arcuate portion, each web being drawn over the upper planar surface, the arcuate portion, and the lower planar surface of one of the heat shoes; the lower planar surface of the upper heating shoe being separates sufficiently from the upper planar surface of the lower heat shoe so that the webs and sandwiched article are not squeezed by the heat shoes.

* * * * *

UNITED STATES PATENT OFFICE
CERTIFICATE OF CORRECTION

Patent No. 4,226,664  Dated October 7, 1980

Inventor(s) MYRON W. SHAFFER

It is certified that error appears in the above-identified patent and that said Letters Patent are hereby corrected as shown below:

On the Title Page,

[73] Assignee is changed to -- Thermo-Seal, Inc., Fort Worth, Texas --.

Claim 1 is changed to read:

1. In an apparatus for continuously laminating articles with a plastic having an adhesive side that melts at a lower temperature than the other side, the apparatus being of the type having a pair of supply rolls of plastic, means for drawing webs from the supply rolls past heating means and through a pair of pressure rollers for bonding the webs together with the article sandwiched between, and a pair of pull rollers mounted behind the pressure rollers for maintaining tension as the bonded webs cool, an improved heating means comprising:

upper and lower heat shoes mounted to the apparatus adjacent the pressure rollers and spaced apart vertically for contacting the webs, each heat shoe having a heating surface for contacting one of the webs and containing an electrical heater element means for heating the entire heating surface to a substantially uniform temperature above the melting temperature of the adhesive side, the heating surface having an arcuate portion joined by upper and lower planar surfaces symetrical with each other and extending rearward tangental to

UNITED STATES PATENT OFFICE
CERTIFICATE OF CORRECTION

Patent No. 4,226,664      Dated October 7, 1980

Inventor(s) MYRON W. SHAFFER

It is certified that error appears in the above-identified patent and that said Letters Patent are hereby corrected as shown below:

the arcuate portion, each web being drawn over the upper planar surface, the arcuate portion, and the lower planar surface of one of the heat shoes; the lower planar surface of the upper heating shoe being separated sufficiently from the upper planar surface of the lower heat shoe so that the webs and sandwiched article are not squeezed by the heat shoes; and a rearwardly projecting bracket extending from the rearward side of each heat shoe in close proximity to the nearest pressure roller for retaining heat in the vicinity of the pressure roller.

Signed and Sealed this

Seventeenth Day of February 1981

[SEAL]

*Attest:*

RENE D. TEGTMEYER

*Attesting Officer*      *Acting Commissioner of Patents and Trademarks*